(12) United States Patent
Johnson et al.

(10) Patent No.: US 12,112,365 B2
(45) Date of Patent: *Oct. 8, 2024

(54) PROBABILISTIC DETERMINATION OF COMPATIBLE CONTENT

(71) Applicant: Pinterest, Inc., San Francisco, CA (US)

(72) Inventors: Brian Johnson, San Francisco, CA (US); John Milinovich, San Francisco, CA (US); Lance Alan Riedel, Menlo Park, CA (US); Andrew Look, San Francisco, CA (US); Mukund Narasimhan, Bellevue, WA (US); Yu Liu, Los Altos, CA (US)

(73) Assignee: Pinterest, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,359

(22) Filed: May 27, 2022

(65) Prior Publication Data

US 2022/0284501 A1    Sep. 8, 2022

Related U.S. Application Data

(63) Continuation of application No. 15/957,822, filed on Apr. 19, 2018, now Pat. No. 11,373,230.

(51) Int. Cl.
*G06Q 30/06* (2023.01)
*G06F 16/957* (2019.01)
(Continued)

(52) U.S. Cl.
CPC ..... *G06Q 30/0631* (2013.01); *G06F 16/9577* (2019.01); *G06Q 30/0201* (2013.01); *G06Q 30/0282* (2013.01); *G06Q 50/01* (2013.01)

(58) Field of Classification Search
CPC .......... G06Q 30/0631; G06Q 30/0201; G06Q 30/0282; G06Q 50/01; G06F 16/9577
(Continued)

(56) References Cited

U.S. PATENT DOCUMENTS 8,112,720 B2 * 2/2012 Curtis ................... G06Q 10/00
715/833
9,535,996 B1 * 1/2017 McCann ............. G06F 16/9535
(Continued)

FOREIGN PATENT DOCUMENTS

EP          3032479 A1     6/2016
JP     2016110402 A  *  6/2016   ............. G06F 17/30
(Continued)

OTHER PUBLICATIONS

Article, "Shutterstock Inc Submits Patent Application for Selected Image Subset Based Search" Global IP News. Optics & Imaging Patent News [New Delhi] Aug. 31, 2017 retrieved from Dialog on Jul. 27, 2023 (Year: 2017).*

*Primary Examiner* — Yogesh C Garg
(74) *Attorney, Agent, or Firm* — Athorus, PLLC

(57) ABSTRACT

According to aspects of the disclosed subject matter, a taste graph comprising likely content collection nodes with corresponding likely digital content items is generated through one or more analyses of a corpus of content collections that is maintained by the online content service. As should be understood, this corpus of content collections is comprised of a plurality of curated content collections, with each content collection comprising a plurality of digital content items. With this taste graph available, as a user generates (or in response to a user generating) a content collection of digital content items, reference can be made to the taste graph to identify one or more digital content items that may be added to the content collection, where the one or more digital content items have a probabilistic likelihood of being complimentary and/or compatible with the other digital content items of the content collection.

18 Claims, 9 Drawing Sheets

(51) Int. Cl.
*G06Q 30/0201* (2023.01)
*G06Q 30/0282* (2023.01)
*G06Q 30/0601* (2023.01)
*G06Q 50/00* (2012.01)

(58) Field of Classification Search
USPC .............................................. 705/26.7, 26.1
See application file for complete search history.

(56) References Cited

U.S. PATENT DOCUMENTS

| | | |
|---|---|---|
| 10,244,286 B1 | 3/2019 | Jia |
| 2009/0049082 A1* | 2/2009 | Slaney .................. G06F 16/637 |
| 2011/0082824 A1* | 4/2011 | Allison .................. G06Q 10/10 |
| | | 706/46 |
| 2014/0169681 A1 | 6/2014 | Drake |
| 2014/0244427 A1 | 8/2014 | Huang et al. |
| 2015/0242750 A1 | 8/2015 | Anderson et al. |
| 2015/0248683 A1* | 9/2015 | Walkingshaw ..... G06F 16/2291 |
| | | 705/7.33 |
| 2017/0213248 A1 | 7/2017 | Jing et al. |
| 2018/0174070 A1 | 6/2018 | Hoffman et al. |
| 2018/0225379 A1 | 8/2018 | Bhadury et al. |
| 2019/0035431 A1 | 1/2019 | Attorre et al. |
| 2019/0057154 A1 | 2/2019 | Philip et al. |
| 2019/0373297 A1 | 12/2019 | Sarkhel et al. |

FOREIGN PATENT DOCUMENTS

| | | | |
|---|---|---|---|
| WO | 0207164 A2 | 1/2002 | |
| WO | WO-2007091243 A2 * | 8/2007 | ....... G06F 17/30743 |
| WO | WO-2014177131 A2 * | 11/2014 | ............. A22B 5/007 |

* cited by examiner

PROBABILISTIC DETERMINATION OF COMPATIBLE CONTENT

CROSS-REFERENCE TO PRIOR APPLICATIONS

This application is a continuation application of and claims benefit to U.S. patent application Ser. No. 15/957,822, filed on Apr. 19, 2018 and entitled "Probabilistic Determination of Compatible Content," which is hereby incorporated by reference herein in its entirety.

BACKGROUND

While there are many online content services available to computer users, there are, among them, at least some that allow their users/subscribers to aggregate digital content items into personal collections of items. For example, Pinterest® (an example of an online content service) enables its users to generate personal content collections, i.e., collections of images.

In regard to the various collections of digital content items, there is a presumption that the items of a user's collection "go together," i.e., that they are compatible and/or complimentary of each other, or at least have some basis of belonging to the collection to the user or users that create the content collection. This aggregation of items into a collection is a reflection of that user's "taste" with those items, and the aggregating user (or users) has curated (i.e., selected, organized and/or presented) the collection of items according to their taste.

Most online content services have many users, including those that encourage or allow content aggregation. By way of example, Pinterest® has millions of users/subscribers that, collectively, have created hundreds of millions of boards (collections/aggregations) from numerous images (digital content items). These collections represent a very large base of human-curated collections according to various individuals' tastes.

Text-based content items lend themselves to analysis. Key terms, phrases, and the like can be identified such that similar content items can be matched together. On the other hand, digital content items comprising images, videos, and/or audio files do not readily lend themselves to analysis. Indeed, the reason that digital content items are viewed as being compatible may be so subtle that even the user who aggregates the collection may not be able to articulate, with any real specificity, why the digital content items of the collection "go together."

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
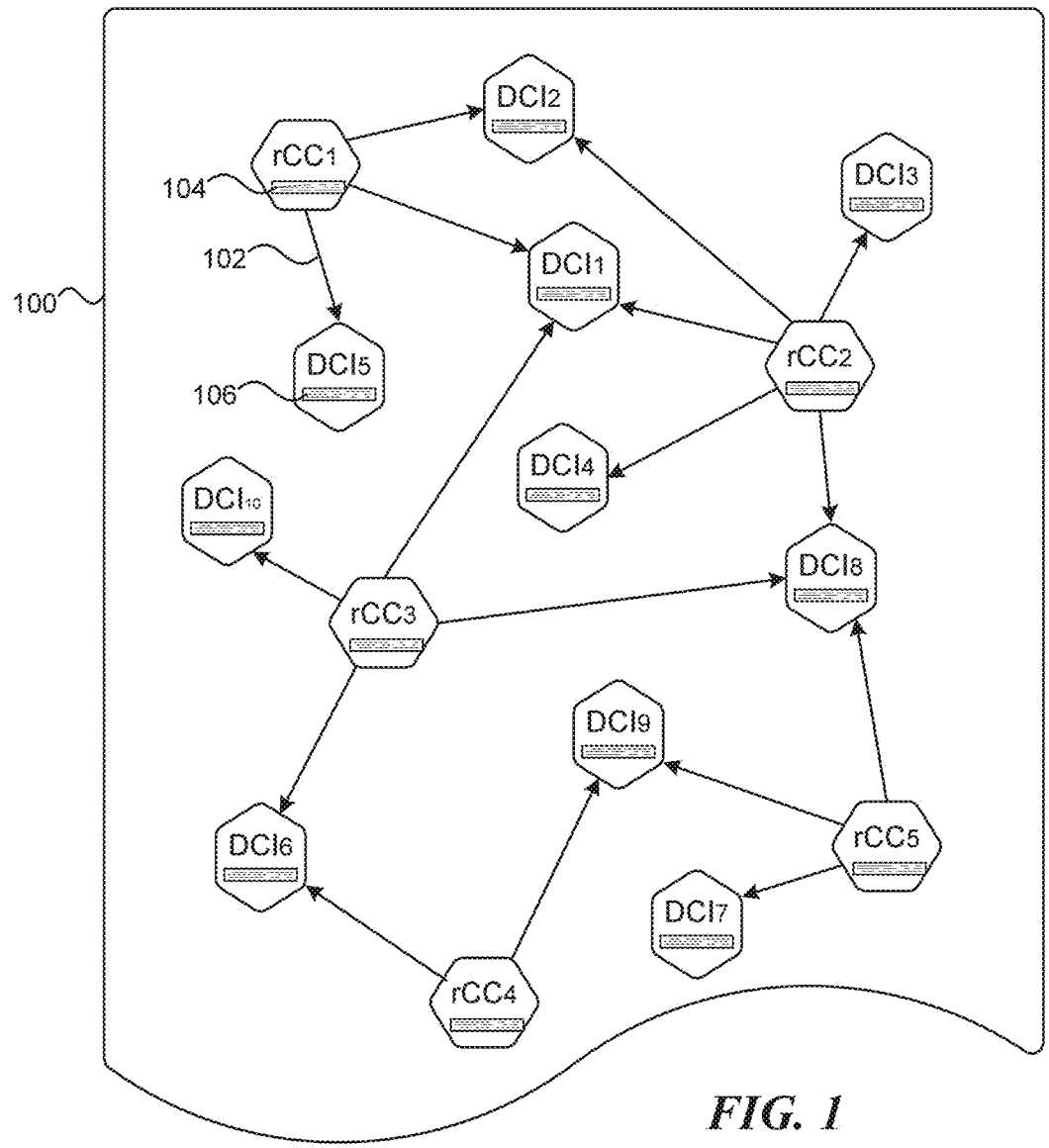
FIG. 1 is a block diagram illustrating an exemplary taste graph configured according to aspects of the disclosed subject matter.

According to aspects of the disclosed subject matter, a taste graph comprising representative content collection nodes with corresponding representative digital content items is generated through one or more analyses of a corpus of content collections that is maintained by the online content service. As should be understood, this corpus of content collections is comprised of a plurality of curated content collections, with each content collection comprising a plurality of digital content items. With this taste graph available, as a user generates (or in response to a user generating) a content collection of digital content items, reference can be made to the taste graph to identify one or more representative digital content collections, and from the representative digital content collections, identify one or more representative digital content items that may be added to the content collection, where the one or more representative digital content items have a probabilistic likelihood of being complimentary and/or compatible with the other digital content items of the content collection generated by the user. Advantageously, as a user generates a content collection, the user is provided with one or more digital content items (that may be included in the content collection) that have a high likelihood of being compatible with and/or complimentary to the existing elements of the content collection. This "recommendation" of one or more additional content items is made according to one or more features corresponding to the digital content items of the content collection generated by the user. This "recommendation" may be made for digital content items that meet or exceed a probabilistic likelihood threshold of being compatible/complimentary.

In contrast to social networking services whose focus is about building and interacting with others, the online content services described herein are not focused on social networks. Rather, the focus is to enable users to create their own aggregations of content (e.g., collections of images), much as one might maintain his/her own collection of stamps. In this regard, while others might view a user's collection of content, the collection inherently belongs to that user for the benefit of the user. Indeed, even if others are able to repost/repin content from a user's collection, the collection of content remains individual to that user. What this means is that, unlike the aggregations that might result from multiple users, each content collection corresponds uniquely to its creator, and is a reflection of the unique tastes of that user, not that of a group. Advantageously, the content collections of a user can be analyzed and leveraged to identify specific tastes of the user that could not be obtained (as they would be co-mingled with tastes of friends, family, etc.) in a social network setting. Moreover, because the content collections uniquely reflect the individual, locating other users that may have similar "tastes" becomes more accurate and expansive, identifying those that share similar tastes irrespective of whether or not the user is connected, to any degree, by way of the user's social network.

For purposes of clarity and by way of definition, the term "exemplary," as used in this document, should be interpreted as serving as an illustration or example of something, and it should not be interpreted as an ideal or leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users. Moreover, the use of the combination "and/or" with regard to multiple items should be viewed as meaning either or both items.

By way of definition and description, online content service (or online content provider) is a network-accessible platform or service to enable a user to aggregated content according to his/her tastes into one or more content collections, where each collection comprises one or more items of content. By way of illustration, a content collection may comprise a plurality of images that are included within the collection by a user.

As indicated above and by way of definition, a "taste graph" comprises a set of "representative content collections," with each representative content collection comprising a plurality of "representative digital content items." The taste graph is generated through one or more analyses of a corpus of content collections that is typically maintained by the online content service. For human visualization purposes, this set of collections is described in the context of a graph, with representative content collections being a first set of nodes, and each representative content collection being connected to its plurality of representative digital content items.

Regarding a taste graph and by way of illustration, FIG. 1 is a block diagram illustrating an exemplary taste graph 100 as may be generated by the one or more analyses mentioned above. For visualization purposes, the representative content collections (RCCs) of the taste graph 100 are illustrated as originating nodes in the taste graph, including rCC1-rCC5. These RCCs are "originating" nodes since each collection includes a plurality of representative digital content items (RDCIs), each also represented as a node in the taste graph, such as RCDIs DCI1-DCI10) and this "inclusion" is indicated by a directed ray (such as directed ray 102 from rCC1 to DCI5) originating from an RCC node to an RDCI node. For example, rCC1 includes three representative digital content items DCI1, DCI2 and DCI5, and rCC4 includes the representative digital content items DCI6 and DCI9.

While the content collections and digital content items in the taste graph are referred to as "representative," it should be appreciated that in some instances the representative content collections may be system-constructed content collections and not actual user-generated content collections. Similarly, the representative digital content items may be the actual digital content items of a user-generated content collection or may be a substitute digital content item; perhaps a superior quality image or audio than was actually used. Moreover, while the representative digital content items are shown as being included in the taste graph 100, it should be appreciated that, in some embodiments, an actual taste graph may simply include references to the representative digital content items.

Each representative content collection in a taste graph is associated with a feature vector, such as feature vector 104 of rCC1, identifying key features of the representative content collection. Generally speaking, the digital content items are also associated with a feature vector, such as feature vector 106 of DCI5, that identifies various features of the corresponding representative digital content item.

Regarding feature vectors and by way of definition, a feature vector is an n-dimensional collection (referred to as a vector) of feature elements. Each feature element of a feature describes some feature of a "thing:" either some feature of a content collection or some feature of a digital content item. Of course, some features may have no value for a given item. For example, a feature element corresponding to the sampling rate of an audio file will likely have an empty value when applied to a digital image. Each feature element is comprised of at least a feature/value tuple, where the "feature" identifies the type of feature element, and the "value" identifies the value for this particular element. In various embodiments, the feature/value tuple may also include a weighting that identifies a weighting or importance of this particular feature element to the "thing." According to various embodiments of the disclosed subject matter, a feature vector may be implemented as an n-dimensional array of feature elements, or as a sparse array of feature elements where only those feature elements that include substantive information (i.e., not empty values) are included.

In some embodiments the number of distinct features that may be used by the system may range into the thousands of distinct features, though which features and the number of features may be determined according to implementation details. Alternatively, and according to aspects of the disclosed subject matter, the number of specific elements (distinct features) that make up the dimensions of a feature vector is determined, at least in part, according to one or more analyses of the corpus of content collections.

Figure 2:
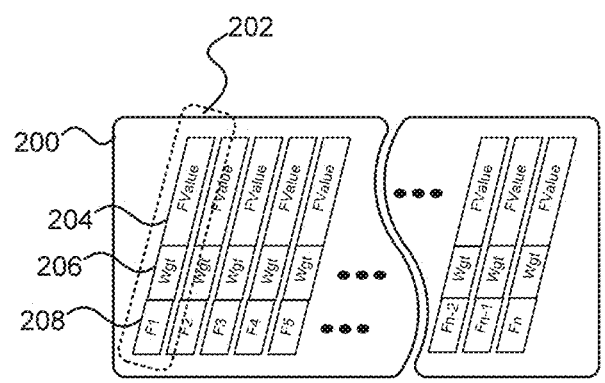
FIG. 2 is a block diagram illustrating an exemplary feature vector formed in accordance with aspects of the disclosed subject matter.

By way of illustration, FIG. 2 is a pictorial diagram illustrating an exemplary feature vector 200, formed in accordance with aspects of the disclosed subject matter. This feature vector 200 includes "n" feature elements, and each feature element, such as feature element 202, is comprised of at least three fields: a feature element type 208, a weighting 206 or importance of the feature to it's corresponding "thing", and a value 204 for that type.

Figure 3:
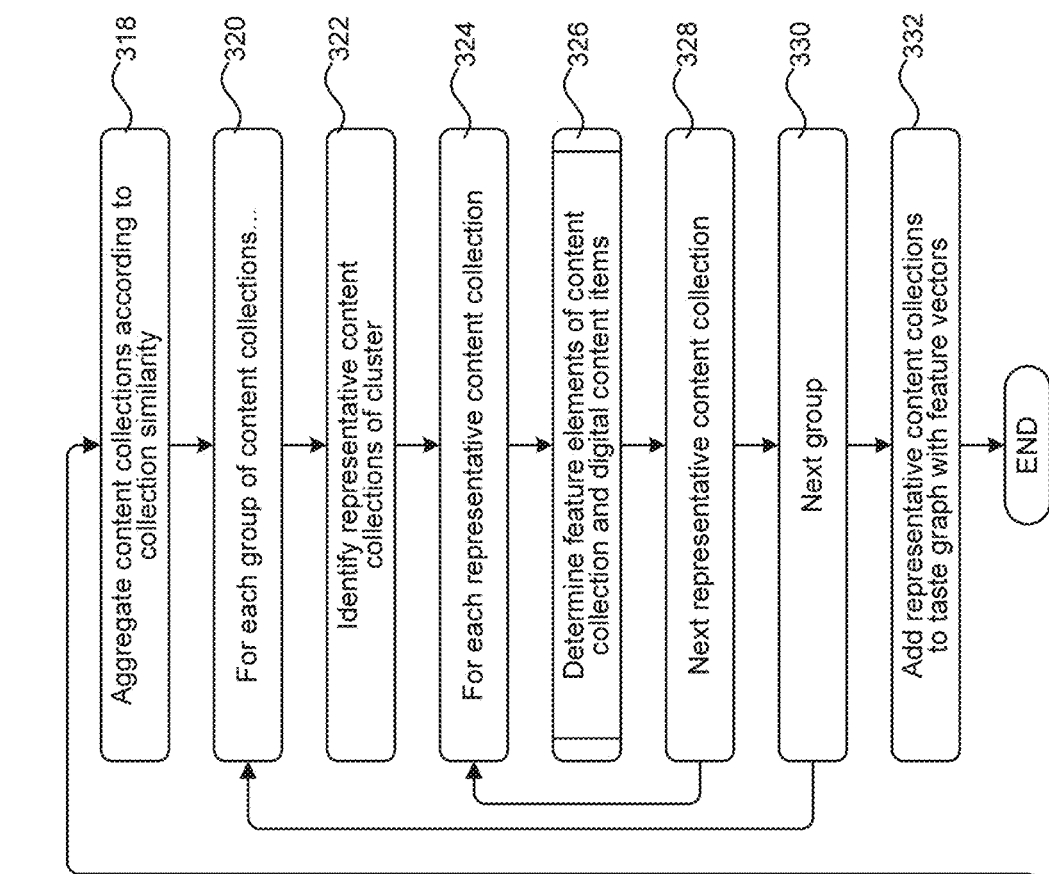
FIG. 3 is a flow diagram illustrating an exemplary routine suitable for determining the dimensions of a feature vector according to a corpus of content collections, in accordance with aspects of the disclosed subject matter.
Figure 3:
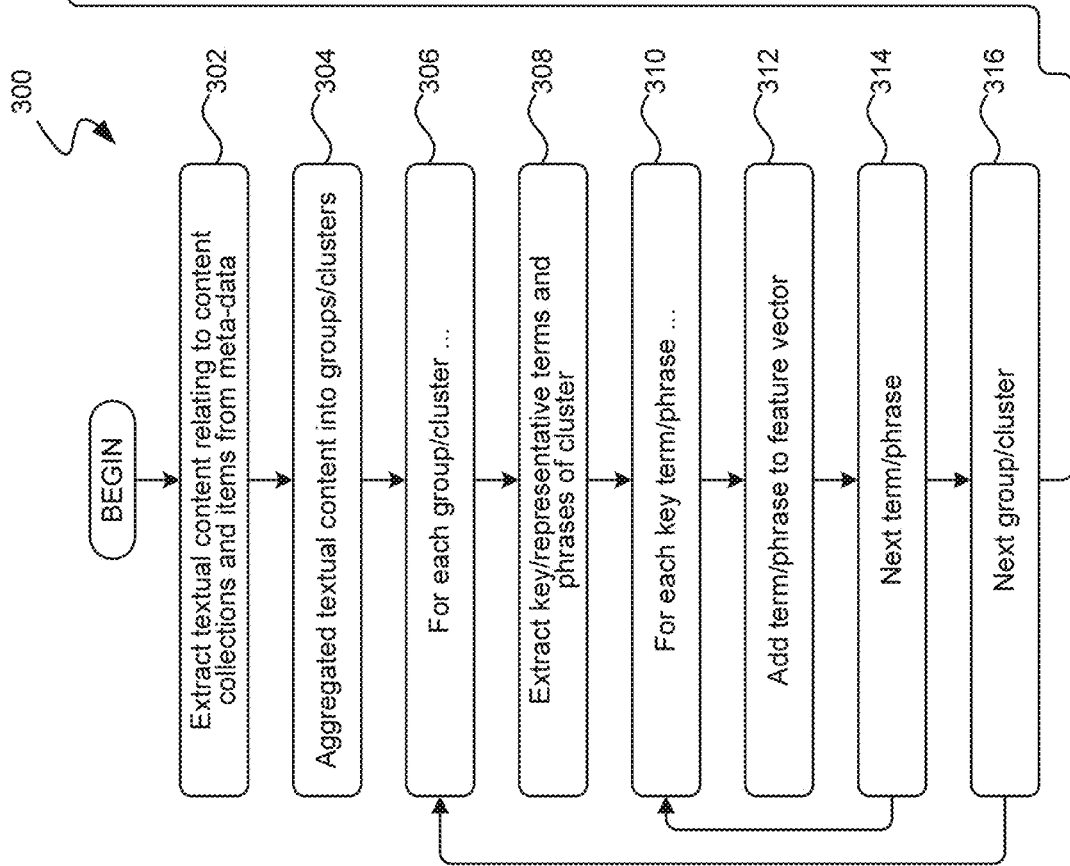

According to aspects of the disclosed subject matter, one or more analyses are conducted on a corpus of content collections in order to identify feature elements that, collectively, make up the dimensions of a feature vector as may be used in a taste graph and in recommending likely content to a person for inclusion in a content collection. Indeed, FIG. 3 is a flow diagram illustrating an exemplary routine 300 suitable for determining the dimensions of a feature vector according to a corpus of content collections, in accordance with aspects of the disclosed subject matter. Beginning at block 302, textual content associated with the various content collections, including their digital content items, is extracted. This textual content may include, by way of illustration and not limitation, titles of content collections, titles of digital content items, file names of digital content items, user comments with regard to content collections and/or digital content items, and the like. Indeed, all text-based meta-data associated with the digital content items is extracted from the various items of the content collections.

At block 304, the extracted textual content is aggregated (or clustered) into a set of textual groups or clusters. These clusters are made according to any one or more of similarity aggregations and/or clustering techniques that may include k-means clustering, predetermined lexicographies, latent semantic indexing (LSI), distance-based clustering, feature selection methods, density-based partitioning, and the like. The result of the clustering is a set of textual clusters representing similar textual elements.

At block 306, an iteration loop is begun to iterate through each of the various textual clusters derived from the corpus of content collections, including the steps of 308-316. At block 308, key or representative terms and phrases are identified and extracted from the currently iterated textual cluster. Identification of the key terms and phrases may be made according to predetermined one or more lexicographies, feature extraction, document frequency/inverse document frequency analyses, and the like.

At block 310, an iteration loop is begun to iterate through each of the representative/key terms and phrases for the currently iterated textual group, comprising the steps of 312-314. At block 312, the currently iterated key term or key phrase is added as a feature element (or dimension) to a feature vector that will serve as the template feature vector for the taste graph discussed above. At block 314, if there are additional key terms or key phrases for the currently iterated textual group, the routine 300 returns to block 310 where the next term/phrase is selected. Alternative, when there are no more terms/phrases to iterate for the currently iterated textual group, the routine 300 proceeds to block 316.

At block 316, if there are any additional textual groups to process, the routine 300 proceeds to block 306 to repeat the key term/phrase extraction process indicated above for another group. Alternatively, if all of the textual groups have been processed, the routine 300 proceeds to block 318.

At block 318, the content collections are aggregated according to content similarity of the various collections. This may be made according to similarities of the digital content items of the collections, common digital content items between content collections, textual content related to the content collections, and the like. Aggregating the content collections of the corpus reduces the number of content collections to a reasonable number, i.e., from 100 million content collections to 100 thousand resulting content collection groups.

At block 320, an iteration loop is begun to iterate through each of the various content collection groups, comprising the steps of 322-330. At block 322, a set of representative content collections of the currently iterated group of content collections is made. The number of representative content collections may be configured according to the size of the aggregated group of content collections, or some other determination. The representative content collections may be selected according to those most representative of the group of content collections, based on size of digital content elements to the collection, commonality of textual terms, commonality of digital content items in the collections, and the like. These representative content collections comprise the content collections of the taste graph.

At block 324, another iteration loop is begun to now iterate through each of the representative content collections, this iteration to identify similar features among the various digital content items of the collections, and comprising steps, 326-328. At block 326, a determination of the various feature elements of the currently iterated representative content collection and its digital content items is made.

Figure 4:
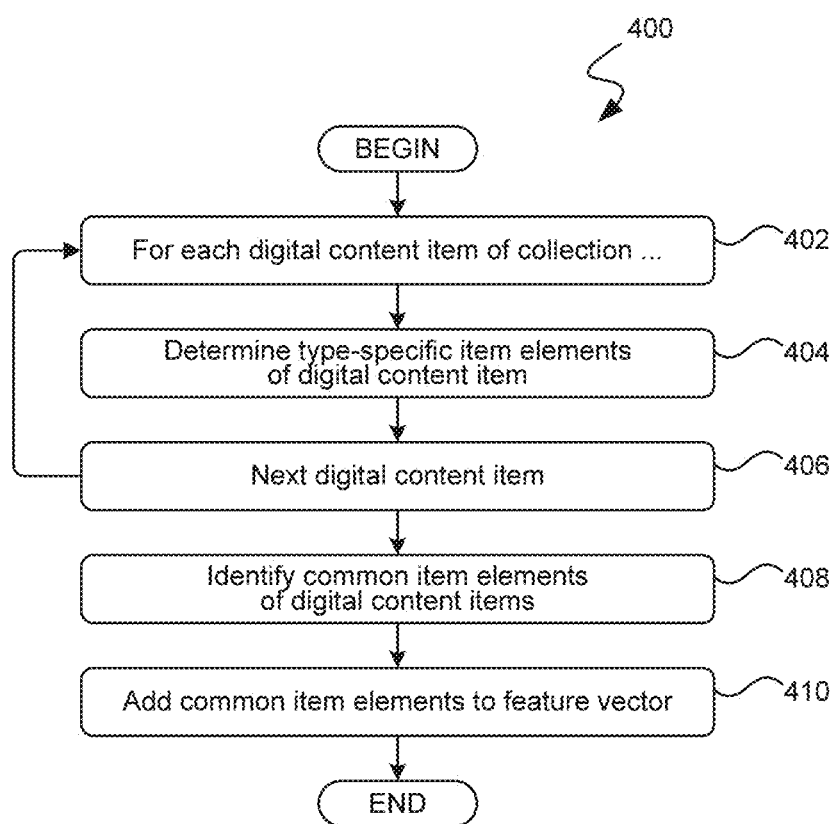
FIG. 4 is a flow diagram illustrating an exemplary routine for identifying common, type-specific item elements of a group of digital content items, in accordance with aspects of the disclosed subject matter.

Turning to FIG. 4, FIG. 4 is a flow diagram illustrating an exemplary routine 400 for identifying common, type-specific item elements of a group of digital content items, in accordance with aspects of the disclosed subject matter. Beginning at block 402, an iteration loop is begun on the current representative content collection, to iterate through its digital content items. At block 404, type-specific (i.e., elements for digital images, or elements for audio content, etc.) are determined for the digital content item. This determination may be made according to an analysis of the digital content item in view of a library of type-specific item elements. After the item elements of the currently iterated digital content item are determined, the routine proceeds to block 406. At block 406, if there are additional digital content items to process, the routine returns to block 402. In the alternative, the routine proceeds to block 408.

At block 408, common item elements among the digital content items of the currently iterated content collection are identified, as well as frequency and importance of each. At bock 410, the common item elements are added to the feature vector as feature elements. Thereafter, routine 400 terminates.

Returning again to routine 300, after having determined feature elements for the currently iterated representative content collection, at block 328, if there are additional representative content collections to process, the routine 300 returns to block 324 to process the remaining collections for the cluster. Alternatively, if there are no additional representative content collections of the current cluster, the routine 300 proceeds to block 330 where a determination is made as to whether there are additional groups/clusters of content collections to process. If so, the routine 300 proceeds to block 320 to process the remaining groups/clusters of content collections. Alternatively, if there are no additional groups to process, the routine 300 proceeds to block 332.

At block 332, all of the representative content collections are added to a taste graph corresponding to the corpus of content collections, with feature vectors (as determined by the processing) associated with the various elements of the taste graph. Thereafter, the routine 300 terminates.

Figure 5:
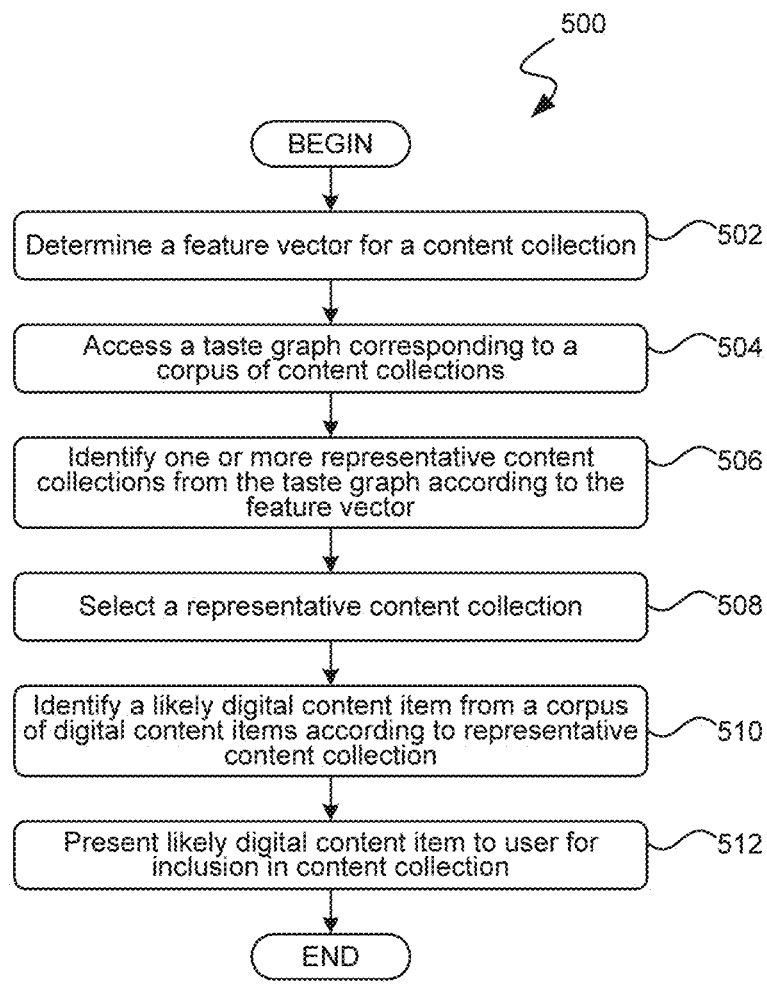
FIG. 5 is a flow diagram illustrating an exemplary routine suitable for recommending likely content to a user for a content collection, according to aspects of the disclosed subject matter.

With a feature vector and a taste graph defined according to various analyses of a corpus of content collections, this information can be advantageously leveraged to identify content to a user for inclusion in a user-generated content collection. FIG. 5 is a flow diagram illustrating an exemplary routine 500 suitable for recommending likely content to a user for a content collection, according to aspects of the disclosed subject matter.

Beginning at block 502, a feature vector is determined for a user-generated content collection, the feature vector having been determined according to one or more analyses of a corpus of content collections. At block 504, a taste graph including representative content collections, such as taste graph 100, is accessed. At block 506, one or more representative content collections of the taste graph are identified, where the identification of the representative content collections is made according to similarities between the feature vector of the user-generated content collection and the feature vectors of the representative content collections.

At block 508, a representative content collection of the identified representative content collections is selected. This selection may be made according to that representative content collection that is most similar to the user-generated content collection according to the feature vectors, as well as in consideration of user preferences with regard to particular items of content.

Based on the selected representative content collection (and, more particularly, according to the feature vector of the content collection), at block 510 an identification of a likely digital content item from a corpus of digital content items is made. This selection is made according to similarities of the feature vector of the selected content collection, where the feature vector may serve as an indexing key into the corpus of digital content items. At block 512, the likely digital content item is presented to the user for inclusion in the user-generated digital content collection. Thereafter, the routine 500 terminates.

In addition to selecting likely digital content items for the user according to the feature vector, consideration may also be made according to a pecuniary interest that the online content service may derive by recommending content. Indeed, while selection may be made as a function of similarities between feature vectors, this calculus may also consider pecuniary benefit such that the greater the benefit to the online content service, the less similar a likely digital content item needs to be. This allows for third party vendors and/or advertisers to include content that goes with elements of a user-generated content collection, based on similarity of a sponsored item to elements of the user-generated content collection. Further still, weighting, as discussed earlier, may be considered in determining similarity between digital content items.

As can be appreciated, according to various embodiments of the disclosed subject matter, one or more likely digital content items are identified and recommended to the user according to similarity of content items, i.e., what items are determined to "go together." This is not simply based on the frequency that users include a digital content item in a certain context, but on the elements of the digital content item. Thus, a newly identified digital content item may be recommended to a user for inclusion in a user-generated content collection due to its similarity (as determined by feature vectors), even though it has not been recommended beforehand.

Figure 6:
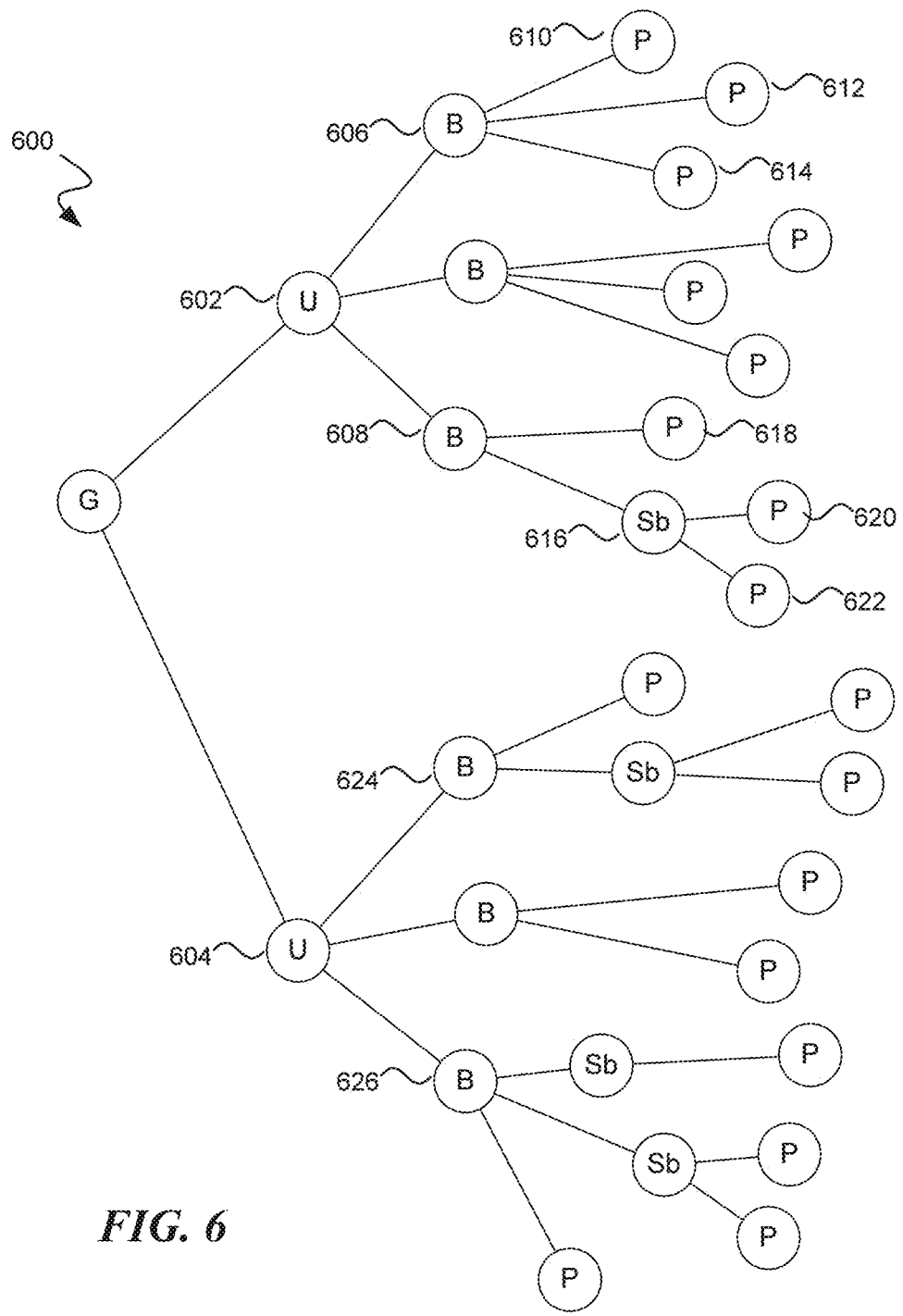
FIG. 6 is a pictorial diagram illustrating an exemplary content graph as may be used to generate a taste graph in accordance with aspects of the disclosed subject matter.

Regarding the taste graph 100 and particularly in regard to generating such a taste graph, one advantage of online content services is that the subscribers/users of the services provide a human-curated set of content from which a taste graph may be derived. The social networking service/online content service Pinterest® allows users to post content in content collections that are meaningful to the individual users, and to further group and annotate such content. This user provided/curated content is stored and maintained in a content graph. By way of illustration, FIG. 6 is a pictorial diagram illustrating an exemplary content graph 600 as may be used to generate a taste graph in accordance with aspects of the disclosed subject matter. Of course, where an online content service such as Pinterest® may store/maintain a content graph that contains over 10 million boards of content items (referred to as pins), representing such an immense content graph in a figure is prohibitive. However, while the exemplary content graph 600 includes content from only two users (as represented by nodes 602 and 604), the simple graph is sufficient to illustrate various aspects of the disclosed subject matter.

As mentioned, the exemplary content graph 600 includes the content of two users, represented in the graph by nodes 602 and 604. For purposes of description, the users will be referred to as User1 (corresponding to node 602) and User2 (corresponding to node 604). In this exemplary content graph, each user has created as set of content collections, referred to as boards, into which content items may be aggregated. In regard to content graph 600, both User1 and User2 have created 3 boards, including boards 606 and 608 (for User1), and 624 and 626 (for User2).

Each board, such as board 608, includes one or more items of content, such as content items 610, 612 and 614 of board 606, and content items 618, 620 and 622 of board 608. These content items may include a variety of different formats of content. In regard to Pinterest's content, the content items are typically images/pictures or videos. In addition to content items, each board may also include a sub-board that identifies a subset of the board's content as a particular sub-species of the board's content. For example, board 608 includes a sub-board 616 that contains content items 620 and 622.

Regarding the sub-boards and by way of illustration, it is often common for a person to post content items and identify a particular subset of those items with a more specific, particular label. For example, if User1 were to post images of a trip to Japan on board 608, User1 could create a sub-board (e.g., 616) in which images of Kyoto, Japan were identified.

Image items that are posted to a user's board are often associated with textual annotations. Boards may be labeled/annotated with textual information, images may be similarly annotated/labeled with textual content. Content items are associated with file names (or URL information) that can be mined for textual content relating to the items. Additionally, the users will often provide comments regarding the various content items of a board. Similarly, sub-boards are often annotated such that the purpose of the subset is readily apparent. As will be explained below, all of this content (textual annotations and/or metadata and content items) may be used to determine a taste graph.

Figure 7:
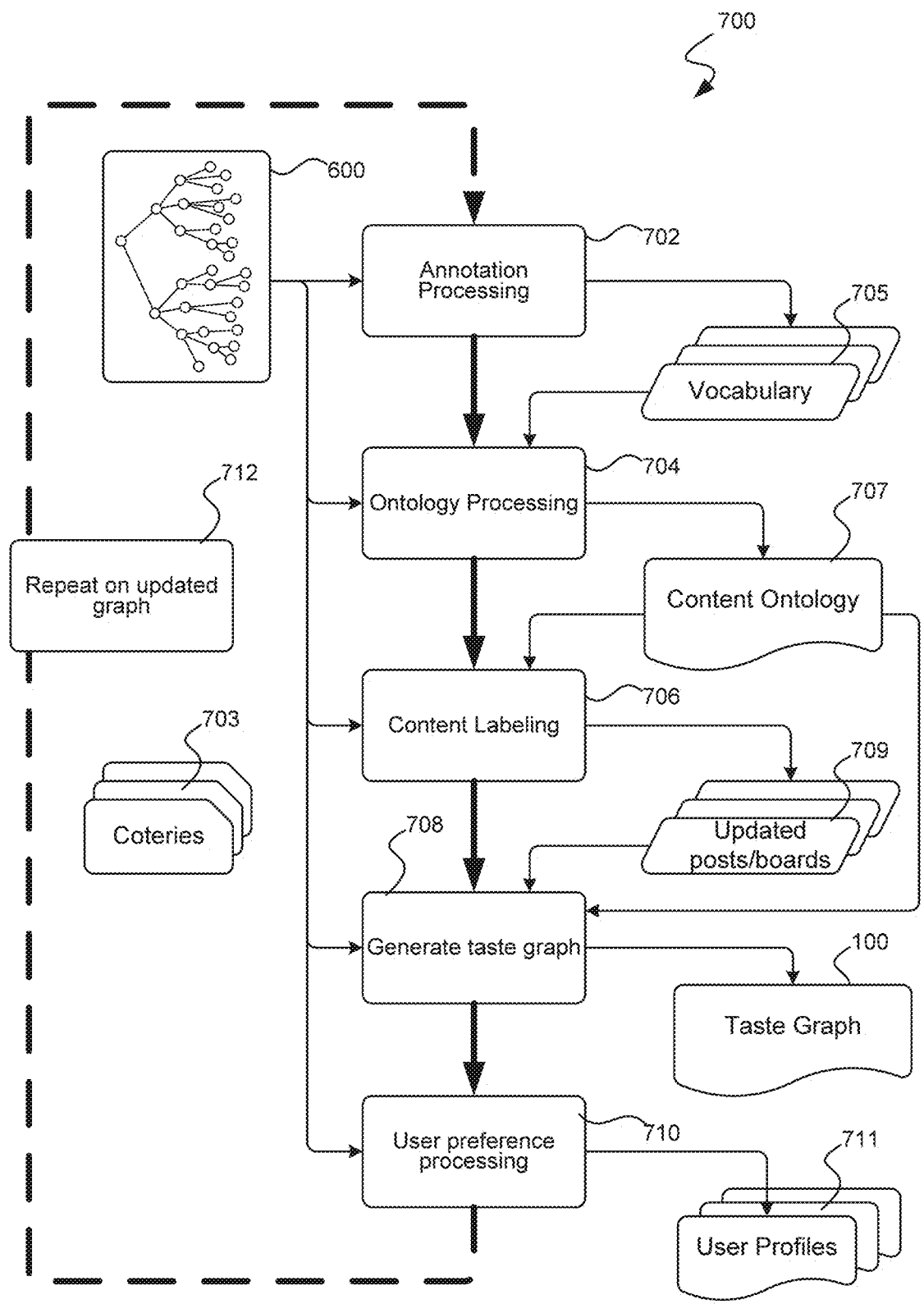
FIG. 7 is a flow diagram illustrating an exemplary routine for processing a content graph into a taste graph in accordance with aspects of the disclosed subject matter.

Turning to FIG. 7, FIG. 7 is a flow diagram illustrating the processing of a content graph, such as content graph 600, in creating a taste graph. Beginning at block 702, a content graph, such as content graph 600, is accessed and processed for the annotations associated with the various boards, sub-boards and content items. This processing, which takes the annotations, tokenizes them to identify the various, distinct words and phrases in the annotations, is used to create a large set of words, referred to as the vocabulary 705, that are associated with the content graph. Of course, this vocabulary will typically include misspellings, abbreviations, synonyms, non-descriptive terms (e.g., articles, conjunctions, and the like) which, without reduction, results in a very large number of vocabulary terms.

In order to process the various annotation terms, one or more "coteries" 703 are utilized. A coterie is a computer-implemented set of rules or heuristics that accept input data (e.g., tokens) and generate output data. In the context of processing the content graph in regard to annotations, a coterie may be generated to search for abbreviations and expand the abbreviations to its corresponding word/token. Another coterie may be generated (or provided) to map synonyms to a corresponding token. A coterie may be provided to eliminate non-descriptive words/tokens from the body of tokens (words/tokens such as "the," "and," and the like. A coterie may be directed to translating tokens to a common language, e.g., English. Another coterie may be directed to generating tokens from multiple words/terms. For example, while the terms "chicken" and "Marsala" might be viewed as separate tokens in a given context, in various contexts the term "Chicken Marsala" may be viewed as a single token. This coterie may examine the context of multiple, distinct words to determine whether they should be viewed as a single, multi-word token. Yet another coterie may be provided to review the remaining tokens and identify a set of the top-most occurring tokens, with this identified set becoming the vocabulary of the content graph. In one embodiment, the vocabulary is selected from the 100,000 most common tokens of the content graph. This coterie may map various less-occurring tokens (much like a synonym) into a frequently occurring token or eliminate the less-occurring tokens (much like a non-descriptive coterie would eliminate some tokens.)

At block 704, an ontology processing of the vocabulary 705 and the content graph 600 is conducted. According to aspects of the disclosed subject matter, the ontology corresponds to a hierarchical relationship of items, based on the vocabulary 705. In this, an evaluation of the relationship within the content graph 600, e.g., whether items are included in a sub-board, hierarchical relationships may be determined. A coterie may be provided to analyze the structure of the content graph in regard to various terms to identify hierarchical relationships. Similarly, a coterie may be utilized to analyze the relationship of board tokens (words/phrases that a user employs to annotate at a board level) in view of content tokens (words/phrases that a user employs to annotate the content items in a board) to identify hierarchical relationships.

At block 706, using the currently defined vocabulary 705 and content ontology 707, another coterie may be deployed to perform content labeling in the content graph 600. As will be discussed below, with content labels associated with content items and content collections/boards, when a user updates a content collection with new content, the process of labeling the new content with vocabulary terms (or updating the vocabulary terms), as well as confirming or updating ontology relationships both the annotation processing and ontology processing steps may be readily and efficiently accomplished. Additionally, frequency of content usage is more readily identified due to the common vocabulary, labels and ontology.

Based on the now-labeled content graph, vocabulary 705 and content ontology 707, at block 708 a coterie is deployed to analyze the various content items of the content graph, in view of the content ontology 707, to identify a taste graph 100 as discussed above. At block 710, the labeled content graph is processed, by a coterie, to associate the labels of a user's posted content and content boards into user profiles 711 as user preferences.

Of course, a content graph 600 hosted/maintained by an online content service is not a static structure. Indeed, in most instances, an online content service's content graph is updated constantly. These additional updates may be used to augment and/or refine the vocabulary 705, content ontology 707, taste graph 100, and/or user profiles 711. Thus, at block 712, at a periodic interval or when sufficient additional content is obtained, the process is repeated. As an efficiency measure, only that additional content that has not been previously processed could be processed and folded into the existing information bases: e.g., vocabulary, content ontology, taste graph, and user profiles.

Regarding routines 300, 400, 500 and 700 described above, as well as other routines and/or processes described or suggested herein, while these routines/processes are expressed in regard to discrete steps, these steps should be viewed as being logical in nature and may or may not correspond to any specific actual and/or discrete execution steps of a given implementation. Also, the order in which these steps are presented in the various routines and processes, unless otherwise indicated, should not be construed as the only or best order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while these routines and/or processes include various novel features of the disclosed subject matter, other steps (not listed) may also be included and carried out in the execution of the subject matter set forth in these routines, some of which have been suggested above. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard to FIG. 9 below. Additionally, in various embodiments all or some of the various routines may also be embodied in executable hardware modules including, but not limited to, systems on chips (SoC's), codecs, specially designed processors and or logic circuits, and the like.

As suggested above, these routines and/or processes are typically embodied within executable code blocks and/or modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer executable instructions stored by computer readable media, also referred to as computer readable storage media, which are articles of manufacture. As those skilled in the art will recognize, computer readable media can host, store and/or reproduce computer executable instructions and data for later retrieval and/or execution. When the computer executable instructions that are hosted or stored on the computer readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer readable media may reproduce and/or cause to deliver the computer executable instructions and data to a computing device for execution by one or more processors via various transmission means and mediums, including carrier waves and/or propagated signals, for purposes of this disclosure computer readable media expressly excludes carrier waves and/or propagated signals.

Figure 8:
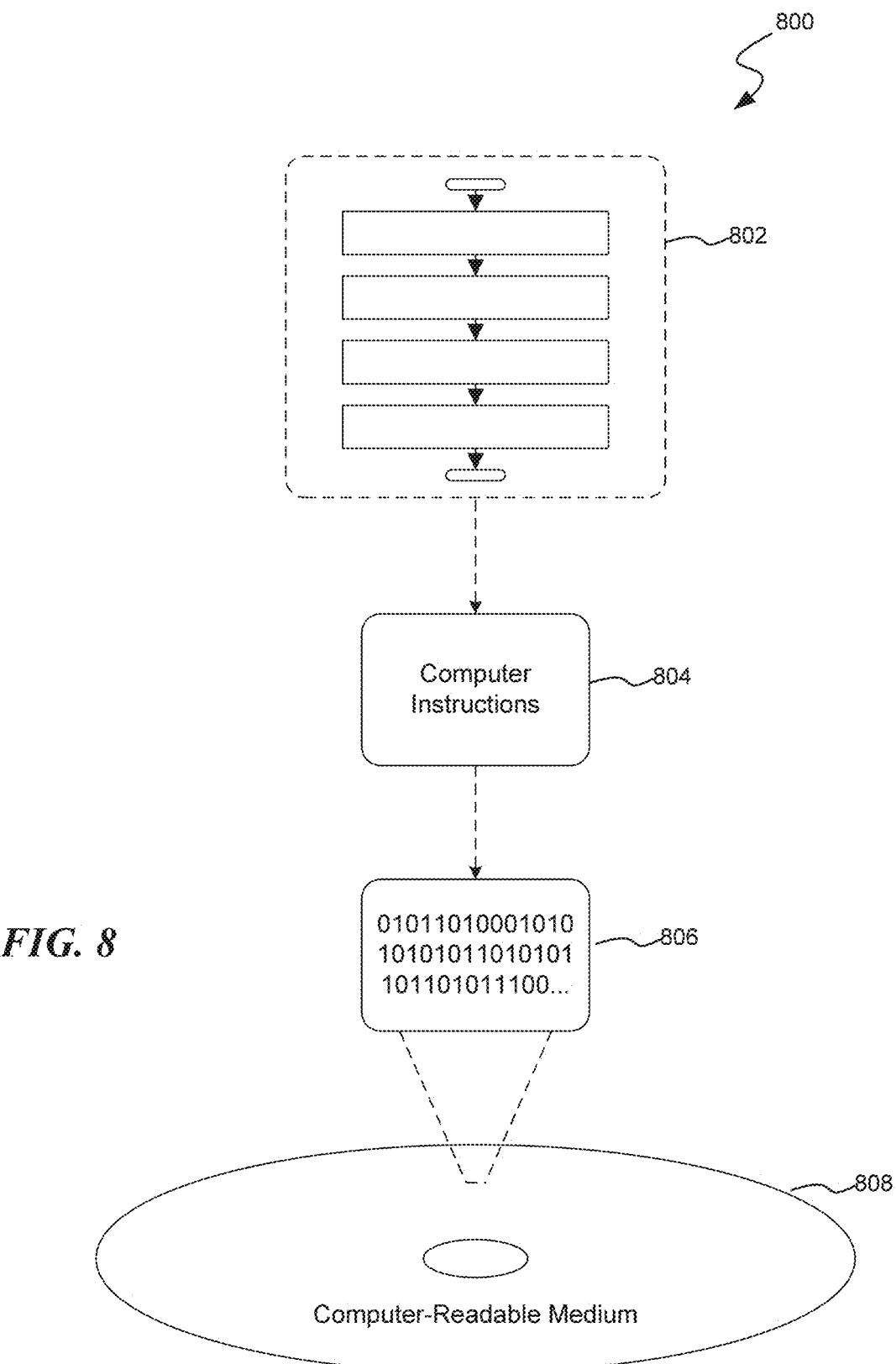
FIG. 8 is a block diagram illustrating an exemplary computing device suitable for implementing aspects of the disclosed subject matter.

Regarding computer readable media, FIG. 8 is a block diagram illustrating an exemplary computer readable medium encoded with instructions for selecting a set of users for receiving notice of a re-post action of an item of content, as described in regard to routines 300, 400 and 500 of FIGS. 3, 4 and 5, respectively. More particularly, the implementation 800 comprises a computer-readable medium 808 (e.g., a CD-R, DVD-R or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as at least some of exemplary routines 300, 400, 500 and 700, for example. In another such embodiment, the processor-executable instructions 804 may be configured to implement a system on a computing device, such as at least some of the exemplary, executable components of computing device 900 of FIG. 9, as described below. Many such computer readable media may be devised, by those of ordinary skill in the art, which are configured to operate in accordance with the techniques presented herein.

Figure 9:
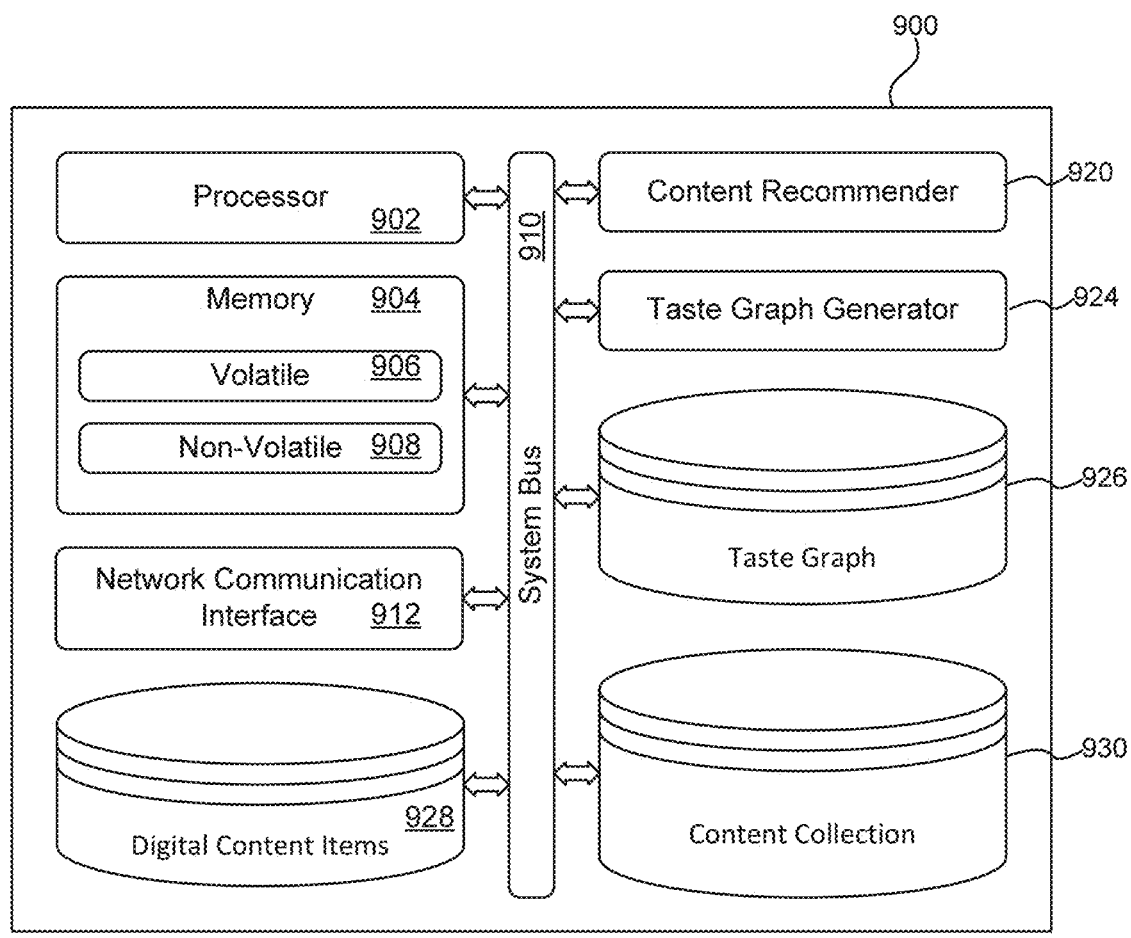
FIG. 9 is a block diagram illustrating an exemplary computing system (or computing device) suitably configured for implementing an online content provider that can recommend likely digital content items for inclusion in a user-generated content collection, in accordance with aspects of the disclosed subject matter.

Turning now to FIG. 9, FIG. 9 is a block diagram illustrating an exemplary computing system 900 (or computing device) suitably configured for implementing an online content service that can recommend likely digital content items for inclusion in a user-generated content collection, in accordance with aspects of the disclosed subject matter. The computing system 900 typically includes one or more processors (or processing units), such as processor 902, and further includes at least one memory 904. The processor 902 and memory 904, as well as other components of the computing system, are interconnected by way of a system bus 910.

As will be appreciated by those skilled in the art, the memory 904 typically (but not always) comprises both volatile memory 906 and non-volatile memory 908. Volatile memory 906 retains or stores information so long as the memory is supplied with power. In contrast, non-volatile memory 908 is capable of storing (or persisting) information even when a power supply is not available. Generally speaking, RAM and CPU cache memory are examples of volatile memory 906 whereas ROM, solid-state memory devices, memory storage devices, and/or memory cards are examples of non-volatile memory 908.

As will be further appreciated by those skilled in the art, the processor 902 executes instructions retrieved from the memory 904, from computer readable media, such as computer readable media 600 of FIG. 6, and/or other executable components in carrying out the various functions of recommending likely digital content items for a content collection. The processor 902 may be comprised of any of a number of available processors such as single-processor, multi-processor, single-core units, and multi-core units, which are well known in the art.

Figure 10:
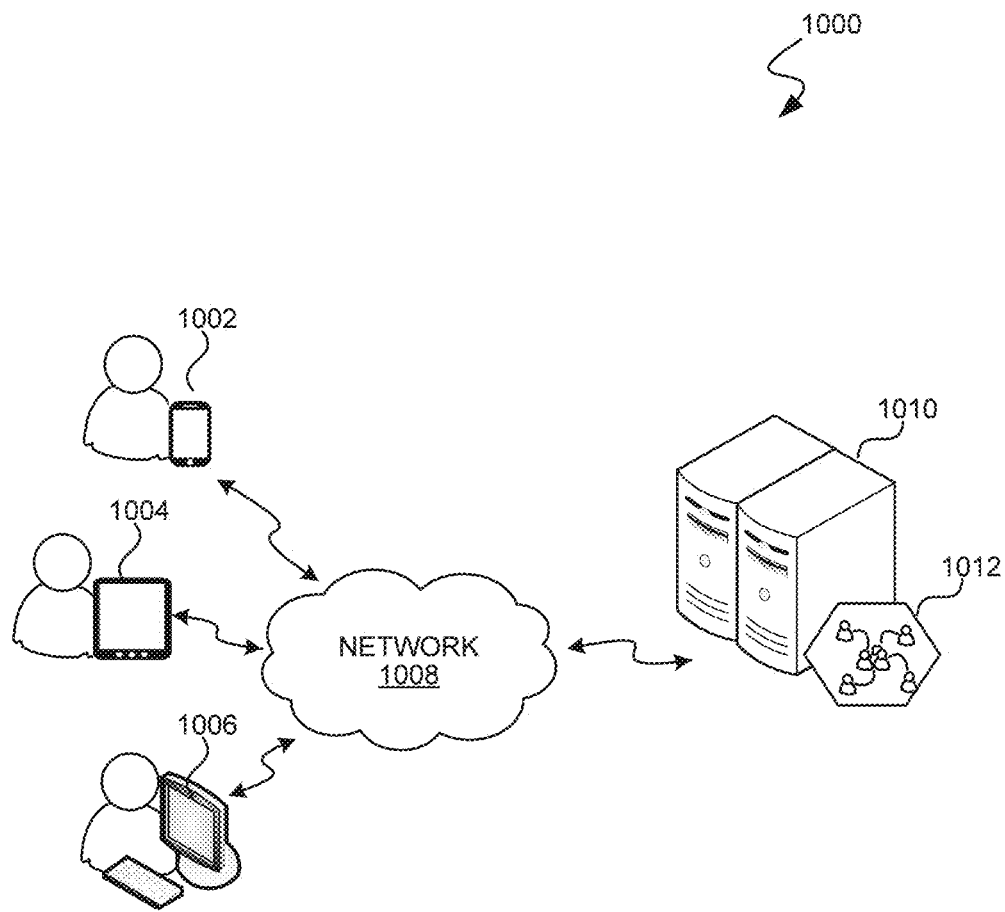
FIG. 10 is a block diagram illustrating an exemplary network environment suitable for implementing aspects of the disclosed subject matter.

Further still, the illustrated computing system 900 typically also includes a network communication interface 912 for interconnecting this computing system with other devices, computers and/or services over a computer network, such as network 1008 of FIG. 10. The network communication interface 912, sometimes referred to as a network interface card or NIC, communicates over a network using one or more communication protocols via a physical/tangible (e.g., wired, optical fiber, etc.) connection, a wireless connection such as WiFi or Bluetooth communication protocols, NFC, or a combination thereof. As will be readily appreciated by those skilled in the art, a network communication interface, such as network communication component 912, is typically comprised of hardware and/or firmware components (and may also include or comprise executable software components) that transmit and receive digital and/or analog signals over a transmission medium (i.e., the network).

The exemplary computing system 900 further includes an executable content recommender 920. As described above in regard to routine 500 of FIG. 5, the content recommender provides a recommended digital content item from a digital content items store 928 to a user in regard to a user-generated content collection according to similarities of the recommended content to the content collection. As discussed above, the recommendation is based on information in a taste graph 926 that is generated according to one or more analyses of a corpus of content collections 930 to identify that items that likely "go together."

Also included is an executable taste graph generator 924 that, in execution, generates, the taste graph 926 from the corpus of content collections 930 according to one or more analyses, such as illustratively described above in regard to routine 300 of FIG. 3.

FIG. 10 is a block diagram illustrating an exemplary network environment 1000 suitable for implementing aspects of the disclosed subject matter. In particular the network environment includes one or more computer users, such as computer users connected to computing devices, such as computing devices 1002-1006, to a network 1008. As will be appreciated by those skilled in the art, the user computers may comprise any of a variety of computing devices such as, by way of illustration and not limitation, tablet computers (such as tablet computer 1004), laptop computers, desktop computers (such as desktop computer 1006), smart phones (such as smart phone 1002), and the like.

The user computers 1002-1006 communicate with other computers and/or devices over one or more networks, such as network 1008. As will be appreciated by those skilled in the art, the network 1008 is a telecommunication network over which computing devices and network enabled processes and/or services may communicate and/or exchange data. By way of illustration, a computer network such as network 1008 may comprise any of a local area network or LAN, a wide area network or WAN, or combinations of the two. According to various embodiments of the disclosed subject matter, the network 1008 may comprise the Internet. As those skilled in the art will appreciate, the Internet is a global system of interconnected computer networks that use a defined protocol suite to link devices (including computers) worldwide. Additionally, the Internet is a network of networks that consists of private, public, academic, business, and government networks of varying scope and size, linked by a broad array of electronic, wireless, and optical networking technologies. According to aspects of the disclosed subject matter, the personal computing devices, including user computing devices 1002-1006, can communicate with the network 1008 by way of a wired connection, a wireless connection, an optical connection, or any combination of these.

Also included in the exemplary network environment is an online content service 1012 implemented on a network computing system 1010. As described above, the online content service 1012 may operate as a social networking service in which one or more users are able to generate content collections. Moreover, the online content service 1012 is able to recommend likely digital content items for a content collection of the user according to a taste graph that is generated or curated from a corpus of content collections. Advantageous, the likely digital content items recommended to the user are determined according to feature vectors of digital content items and content collections.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method, comprising:
    determining, by a computing system and in response to a user created digital content collection created by a user and maintained by the computing system, a feature vector associated with the user created digital content collection, wherein the user created digital content collection includes a first plurality of digital content items having different digital content types and the feature vector is determined based at least in part on a computer-implemented analysis of the first plurality of digital content items;
    accessing, by the computing system, a plurality of representative digital content collections organized as a taste graph to identify a first plurality of representative digital content collections from the plurality of representative digital content collections based at least in part on the feature vector and a plurality of representative feature vectors associated with the plurality of representative digital content collections, wherein:
        the plurality of representative feature vectors are determined based at least in part on corresponding computer-implemented analyses of the plurality of representative digital content collections; and
        the taste graph is unique to the user;
    determining, by the computing system, a first representative digital content collection from the plurality of representative digital content collections based at least in part on a similarity between the feature vector and a first representative feature vector associated with the first representative digital content collection, wherein the first representative digital content collection includes a second plurality of digital content items having different digital content types; and
    identifying, by the computing system and based at least in part on the first representative digital content collection, a first digital content item from a corpus of digital content items as a recommended digital content item, wherein the first digital content item is not included in the first plurality of digital content items.

2. The computer-implemented method of claim 1, wherein the feature vector includes a plurality of feature elements.

3. The computer-implemented method of claim 2, wherein each of the plurality of feature elements corresponds to at least one of a first feature of the user created digital content collection or a second feature of at least one of the first plurality of digital content items.

4. The computer-implemented method of claim 2, wherein at least one of the plurality of feature elements is a type-specific feature element corresponding to a digital content type.

5. The computer-implemented method of claim 2, wherein each of the plurality of feature elements includes a feature-value tuple corresponding to a feature element type and a feature element value.

6. The computer-implemented method of claim 5, wherein the feature-value tuple includes a weighting.

7. A computing system, comprising:
    at least one processor; and
    a memory storing program instructions that, when executed by the at least one processor, cause the at least one processor to at least:
        determine, by the computing system, a feature vector associated with a digital content collection created by a user and maintained by the computing system, wherein the digital content collection includes a first plurality of digital content items having different digital content types and the feature vector is determined based at least in part on a computer-implemented analysis of the first plurality of digital content items;
        access, by the computing system, a plurality of representative digital content items organized as a taste graph to identify a first representative digital content collection from a plurality of representative digital content collections based at least in part on a similarity between the feature vector and a plurality of representative feature vectors associated with the plurality of representative digital content collections, wherein the first representative digital content collection includes a second plurality of digital content items having different digital content types, wherein;
        the plurality of representative feature vectors are determined based at least in part on corresponding computer-implemented analyses of the plurality of representative digital content collections; and
        the taste graph is unique to the user; and
    determine, based at least in part on the first representative digital content collection, a first digital content item from a corpus of digital content items as a likely digital content item for inclusion in the digital content collection, wherein the first digital content item is not included in the first plurality of digital content items.

8. The computing system of claim 7, wherein at least a portion of the plurality of representative digital content collections are generated by the computing system.

9. The computing system of claim 7, wherein the feature vector includes a plurality of feature elements.

10. The computing system of claim 9, wherein each of the plurality of feature elements corresponds to at least one of a first feature of the digital content collection or a second feature of at least one of the first plurality of digital content items.

11. The computing system of claim 10, wherein at least one of the plurality of feature elements is a type-specific feature element corresponding to a first digital content type.

12. The computing system of claim 11, wherein the first plurality of digital content items does not include a digital content item of the first type and the type-specific feature element includes a null value.

13. The computing system of claim 9, wherein each of the plurality of feature elements includes a feature-value tuple corresponding to a feature element type and a feature element value.

14. A computer-implemented method, comprising:
- determining, by a computing system and in response to a user created digital content collection created by a user and maintained by the computing system, a feature vector associated with the user created digital content collection, wherein the user created digital content collection includes a first plurality of digital content items having different digital content types and the feature vector is determined based at least in part on a computer-implemented analysis of the first plurality of digital content items;
- accessing, by the computing system, a plurality of representative digital content collections organized as a taste graph to identify a first representative digital content collection from the plurality of representative digital content collections based at least in part on a similarity between the feature vector and a plurality of representative feature vectors associated with the plurality of representative digital content collections, wherein:
  - the first representative digital content collection includes a second plurality of digital content items having different digital content types and the plurality of representative feature vectors are determined based at least in part on corresponding computer-implemented analyses of the plurality of representative digital content collections; and
  - the taste graph is unique to the user; and
- determining, based at least in part on the first representative digital content collection, a first digital content item from a corpus of digital content items as a likely digital content item for inclusion in the user created digital content collection, wherein the first digital content item is not included in the first plurality of digital content items.

15. The computer-implemented method of claim 14, wherein at least a portion of the plurality of representative digital content collections are generated by the computing system.

16. The computer-implemented method of claim 14, wherein:
- the feature vector includes a plurality of feature elements; and
- each of the plurality of feature elements corresponds to a feature element type, a feature element value, and a weighting.

17. The computer-implemented method of claim 16, wherein at least one of the plurality of feature elements is a type-specific feature element corresponding to a first digital content type.

18. The computer-implemented method of claim 14, wherein the feature vector and the representative feature vectors are each implemented as a sparse array of feature elements.

* * * * *